Oct. 29, 1935.   J. O. BETTERTON   2,019,470
CHLORIDIZATION OF METALS
Filed Jan. 13, 1934
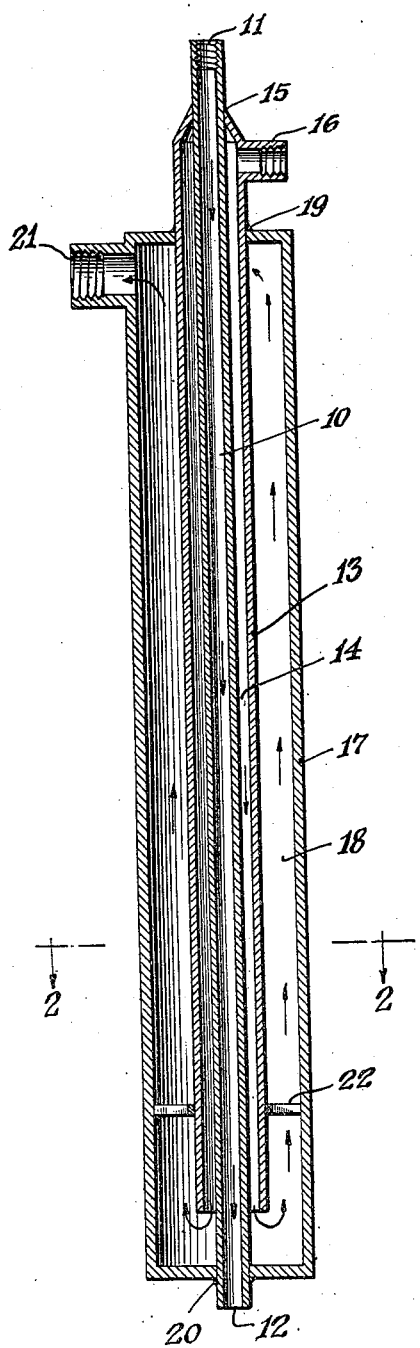
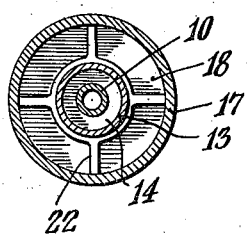
INVENTOR
Jesse O. Betterton
BY
Austin & Dix
ATTORNEYS Patented Oct. 29, 1935

2,019,470

UNITED STATES PATENT OFFICE 2,019,470

CHLORIDIZATION OF METALS

Jesse O. Betterton, Metuchen, N. J., assignor to American Smelting and Refining Company, New York, N. Y., a corporation of New Jersey Application January 13, 1934, Serial No. 706,571

6 Claims. (Cl. 266—34)

This invention relates to metal refining and particularly to a method of separating metals by selective chloridization.

Among other features, the invention provides a method for introducing chlorine into a bath of molten metals in such manner that an efficient separation of the metals is obtained by selective chloridization without substantial corrosion of the apparatus.

The invention provides an efficient and inexpensive means particularly suitable for selectively chloridizing metals on a small scale or under such conditions as do not ordinarily justify the installation of larger and more expensive apparatus ordinarily used in large scale production.

Further, the invention provides for intimately contacting the chlorine with the metal under treatment while simultaneously preventing the very appreciable local rise in temperature at the point of contact between the chlorine and the molten metal. As a result, the corrosive action of the chlorine upon the apparatus, which otherwise would be rapidly accelerated with increases of temperature, is materially reduced. In accordance with the invention, this retardation is accomplished by introducing the chlorine into the body of the molten metal through a conduit surrounded by a circulating cooling medium which conducts the heat generated by the chloridizing reaction away from the apparatus.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a longitudinal view of the apparatus in section; and Fig. 2 is a cross section of the apparatus corresponding with line 2—2 of Fig. 1.

In the following description and in the claims, various details will be identified by specific names for convenience, but they are intended to be as generic in their application as the art will permit.

Referring now to the drawing, in which like reference characters denote like parts, 10 represents a conduit with threaded inlet 11 and outlet 12 for introducing chlorine into the molten metal. This conduit is of such length that the chlorine outlet may be projected into the body of the metal bath, as, for example, near the bottom of the container holding the metal to be treated. By introducing the chlorine near the bottom of the bath, circulation of the metal is effected and the necessity for mechanical agitation may be eliminated, although mechanical agitation may be used in conjunction with the stirring action set up by the introduction of chlorine if desired.

A concentric wall 13 is located about the chlorine conduit 10 throughout substantially its entire length providing an annular space 14. This annular space is closed at its upper end by welding the concentric wall 13 to the chlorine conduit as shown at 15. A threaded nipple 16 is welded to the concentric wall and provides an inlet opening into the annular space 14.

A shell 17 is positioned about the concentric wall 13 providing an annular space 18. The shell is closed at its upper end about the concentric wall by welding as shown at 19. At its lower end the shell is closed about chlorine conduit 10 by welding as shown at 20. It will be noted that the concentric wall 13 does not extend to the bottom end of the shell thus leaving a passageway from the inner annular space 14 to the outer annular space 18. A threaded nipple 21 is welded to the shell near its upper end providing an outlet from the outer annular space 18. A spacing member 22 welded to the outer shell reinforces and holds the concentric wall 13 in position.

In operation, the apparatus may be anchored and positioned in the bath of metal under treatment in such a manner that the chlorine outlet 12 is beneath the surface and preferably near the bottom of the bath. The chlorine conduit inlet 11 is suitably attached to a source of chlorine. The nipple 16, which provides a water circulating inlet, is suitably connected to a source of water supply and the nipple 21, which provides an outlet for the circulating water, is suitably connected to carry away the water after it has passed though the passageway in the apparatus. It will be noted that in the embodiment of the invention shown in the drawing the water passes into the inner annular space 14, flows downwardly about the chlorine conduit and around the lower end of the concentric wall 13 which acts as a baffle, thence into the annular space 18 through which it flows upwardly and finally is exited through nipple 21.

Sufficient water is circulated to maintain the temperature of the apparatus below that at which chlorine combines rapidly with the iron. By proper control of the circulating water or other cooling medium, the heat generated at the point of contact of the chlorine with the molten metal where there is an appreciable local rise in temperature is rapidly dissipated from the system. At the same time, for example, in dezincing lead or deleading bismuth by selective chloridization, the temperature may be maintained high enough to keep the metal and the slag that floats on its surface in a molten condition.

The apparatus may be made of any suitable metal such as, for example, iron pipe, ordinary carbon steel alloys, etc. and, although other cooling medium may be employed, for example, air and steam, water is preferably used as it lends itself to an economical use of the invention. The invention is applicable to many separations of one metal from another by selective chloridization, among which may be mentioned the removal from bismuth of lead, zinc, alkaline earth metals and alkali metals, the dezincing of lead, the removal of alkali and alkaline metals from lead or its alloys, and the removal from zinc of alkali metals, alkaline earth metals and aluminum.

It is seen from the foregoing description that the invention permits the use of a small, portable and inexpensive piece of apparatus for separating metals by selective chloridization. Not only is the initial cost low, which renders the apparatus especially useful, in small scale operations, but, in addition, the life of the apparatus is materially extended by reason of the novel method for preventing or retarding the corrosive action of the chlorine, which otherwise would rapidly destroy the apparatus when the chlorine is introduced into the metal.

While certain novel features of the invention have been disclosed and are pointed out in the annexed claims, it will be understood that various omissions, substitutions and changes may be made by those skilled in the art without departing from the spirit of the invention.

What is claimed is:

1. In the art of separation of metals by selective chloridization, the method of decreasing the corrosion of the apparatus employed in introducing chlorine into the molten metal bath which comprises maintaining the temperature of said apparatus below the surface of said molten bath at a lower temperature than the surrounding molten metal by circulating a cooling medium through said apparatus out of contact with the chlorine and molten bath.

2. In the art of separation of metals by selective chloridization, the method of retarding the corrosive action of chlorine upon the conduit conveying the chlorine into the body of the molten metal bath which comprises circulating a cooling medium about said conduit out of contact with the chlorine or molten bath thereby conducting from the system a substantial part of the heat resulting from the chloridizing reaction.

3. The method according to claim 2 in which the cooling medium is one selected from the class comprising air, water and steam.

4. In the selective chloridization of metals, the improvement which comprises introducing chlorine gas into molten metal via a conduit surrounded by a jacket through which a cooling medium is circulated.

5. The method of introducing chlorine into a molten bath of metal which comprises passing the chlorine into the bath via a conduit while circulating a cooling fluid around the conduit in countercurrent directions thereby substantially preventing corrosive action of the chlorine upon the conduit.

6. The method of introducing chlorine into a bath of molten metal which comprises passing said chlorine into the bath via a conduit surrounded by a column of cooling fluid which is circulated concurrently with the flow of chlorine whereby corrosive action of the chlorine upon the conduit is materially retarded.

JESSE O. BETTERTON.